Sept. 16, 1958   E. J. DE NORMANVILLE   2,851,907
VEHICLE POWER TRANSMISSION MECHANISMS
Filed Sept. 19, 1955                    2 Sheets-Sheet 1

Inventor
E. J. de Normanville

Sept. 16, 1958 E. J. DE NORMANVILLE 2,851,907
VEHICLE POWER TRANSMISSION MECHANISMS
Filed Sept. 19, 1955 2 Sheets-Sheet 2

Inventor
E. J. de Normanville
By Glascock Downing Seebold
Attys.

United States Patent Office 2,851,907
Patented Sept. 16, 1958

2,851,907

VEHICLE POWER TRANSMISSION MECHANISMS

Edgar Joseph de Normanville, Ashridge Park, Berkhampstead, England, assignor of one-half to Auto Transmissions Limited, Coventry, England Application September 19, 1955, Serial No. 535,220

Claims priority, application Great Britain September 23, 1954

1 Claim. (Cl. 74—781)

This invention relates to vehicle power transmission mechanisms of the epicyclic type, and has for its object to provide a 2-speed and reverse mechanism in a simple and convenient form.

A mechanism in accordance with the invention comprises the combination of a power input shaft, a coaxial power output shaft, a planet pinion carrier secured to the input shaft, planet pinions of different sizes mounted on the carrier, two sun pinions respectively engaging the different planet pinions, an annulus provided with two rings of gear teeth respectively engaging the different planet pinions, means for clutching one of the sun pinions to either the annulus or the housing of the mechanism, means for clutching the annulus or the other sun pinion to the output shaft, and a unidirectional clutch (or clutches) situated as herein specified.

Figure 1:
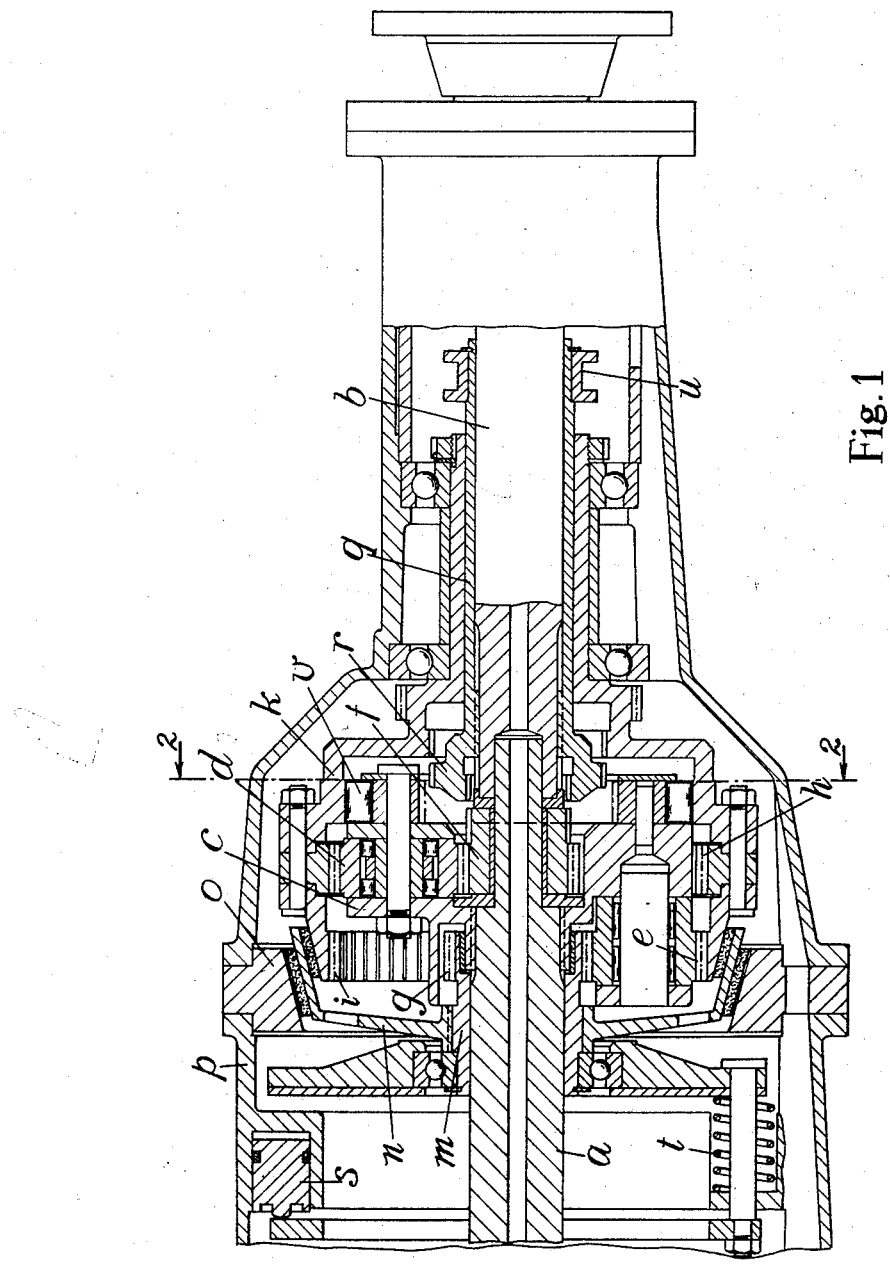
Figure 2:
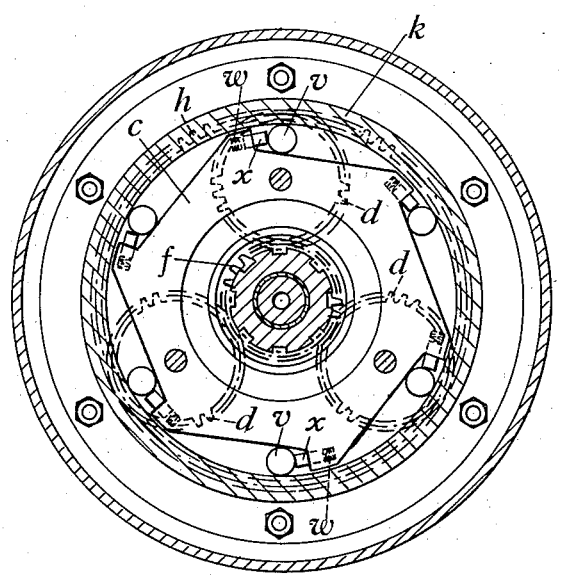

In the accompanying drawings:

Figure 1 is a sectional side elevation of a mechanism constructed in accordance with the invention, and Figure 2 is a cross section on the line 2—2 of Figure 1.

In the example illustrated by the drawings there is provided a hollow power input shaft $a$, and coaxially with the input shaft is arranged a power output shaft $b$. On the input shaft is secured a planet pinion carrier $c$, and on the opposite sides of the carrier are mounted two groups of planet pinions $d$, $e$, the pinions $d$ in the one group being of slightly larger diameter than those $e$ in the other group. The planet pinions engage two sun pinions $f$, $g$ of different diameters and also two rings of teeth $h$, $i$ formed on or secured to the inner periphery of an annulus $k$. The sun pinion $f$ of smaller diameter is freely mounted on the input shaft $a$ and the larger one $g$ is formed on or secured to a sleeve $m$, which is carried by and is rotatably mounted on the input shaft. To this sleeve is secured the movable member $n$ of a friction clutch whereby the associated sun pinion can be secured to either one end of the annulus $k$ or to a complementary fixed part $o$ on the housing $p$ of the mechanism.

On the output shaft $b$ and in spline connection therewith is slidably mounted another sleeve $q$ on which is formed the movable member $r$ of a dog-type clutch whereby either the sun pinion $f$ or the annulus $k$ can be connected to the output shaft.

Any convenient means is provided for actuating the above mentioned slidable clutch members. The member $n$ which serves to connect one of the sun pinions to the housing or annulus may be actuated in one direction by a hydraulic ram $s$ and in the other direction by a spring or springs $t$. The other member $q$ may be adapted for actuation by the driver through a forked lever or other means engaging a collar $u$ on the said member.

In addition to the clutching means above mentioned, there is also provided a unidirectional clutch (or clutches). In one arrangement a clutch of this kind may be provided in association with one or each of the planet pinions which co-operate with the larger sun pinion $g$ or alternatively it may be placed between the larger sun pinion and the input shaft. In the arrangement illustrated the unidirectional clutch is placed between the planet pinion carrier $c$ and the annulus $k$ and comprises rollers $v$ co-operating with suitably shaped surfaces of the parts $c$, $k$, the rollers being loaded by springs $w$ which act on the rollers through the medium of slidable abutment pieces $x$.

The mode of action of the mechanism is as follows:

When it is required to drive the shaft $b$ in the forward direction at the same speed as the shaft $a$, the clutch member $r$ is engaged with the annulus $k$, and the clutch member $n$ is also engaged with the annulus. In this condition the torque is transmittted from $a$ to $b$ through the unidirectional clutch $v$. While in this condition the braking power of the engine can be utilised when the torque is transmitted from $b$ to $a$ by the momentum of the vehicle, this torque being transmitted through the clutch member $n$.

To drive the shaft $b$ at a higher speed than $a$ in the forward direction the clutch member $n$ is engaged with the housing $p$.

To obtain reverse rotation of the shaft $b$ the clutch member $r$ is engaged with the sun pinion $f$, and the clutch member $n$ is engaged with the housing $p$.

For manoeuvring the vehicle in a confined space, or when slipping of the driven road wheels occurs on muddy or snow-covered ground, the clutch member $r$ is engaged with the pinion $f$. The clutch member $n$ is then alternately engaged with the housing and annulus, thereby causing the vehicle to be intermittently moved in the rearward and forward directions.

Having thus described my invention what I claim as new and desire to secure by Letters Patent is:

A two-speed and reverse power transmission mechanism comprising in combination a housing, a power input shaft, a power output shaft arranged coaxially with the power input shaft, a planet pinion carrier secured to the input shaft, planet pinions of two different sizes mounted on the carrier, two sun pinions respectively engaging the different planet pinions, a rotatable annulus having thereon two sets of gear teeth also respectively engaging the different planet pinions, a combined brake and clutch for respectively connecting one of the sun pinions alternatively to the housing and annulus, a second clutch for alternatively connecting the other sun pinion and annulus to the output shaft, and at least one unidirectional clutch arranged to transmit torque in the forward direction from the input shaft to the output shaft when the annulus is connected by the first clutch to the corresponding sun pinion, and by the second clutch to the output shaft.

References Cited in the file of this patent

UNITED STATES PATENTS 2,097,021    De Normanville _____ Oct. 26, 1937